Nov. 4, 1958     H. E. SLOAN     2,859,041
COLLET CHUCKS
Filed April 11, 1958     4 Sheets-Sheet 1
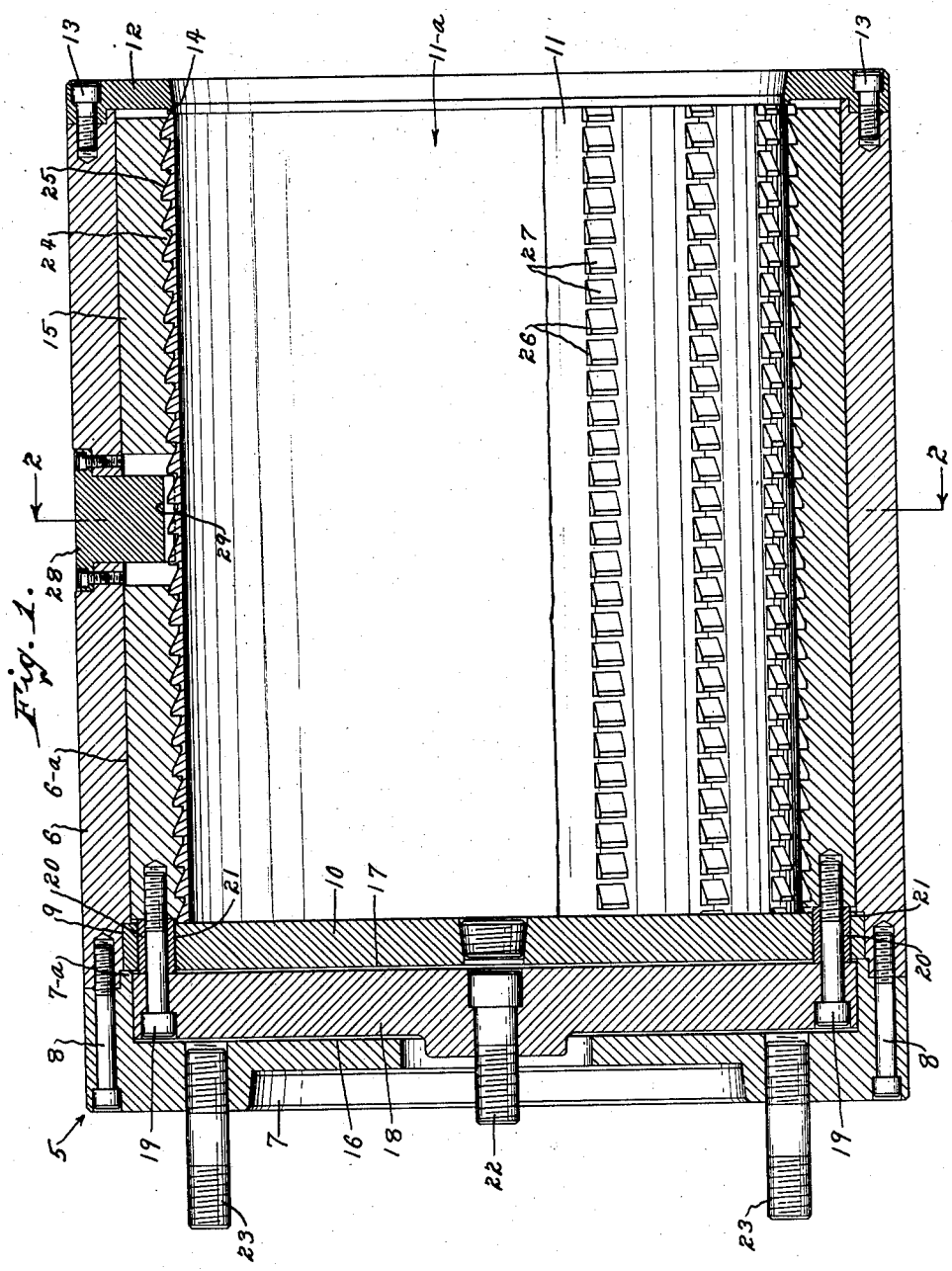
INVENTOR.
HARRY E. SLOAN
BY
Louis V. Lucia
ATTORNEY Nov. 4, 1958  H. E. SLOAN  2,859,041
COLLET CHUCKS
Filed April 11, 1958  4 Sheets-Sheet 2
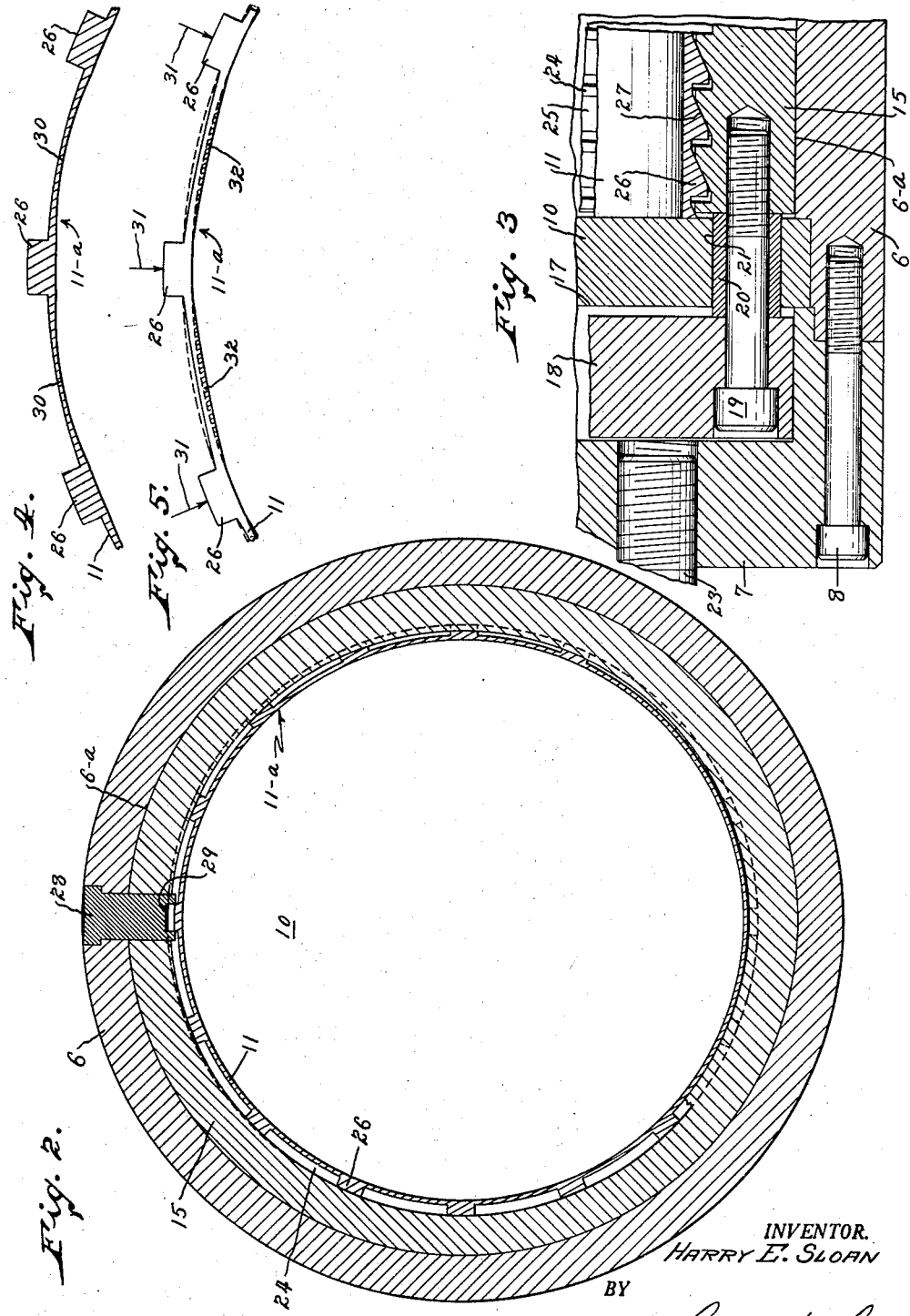
INVENTOR.
HARRY E. SLOAN
BY
Louis V. Lucia
ATTORNEY

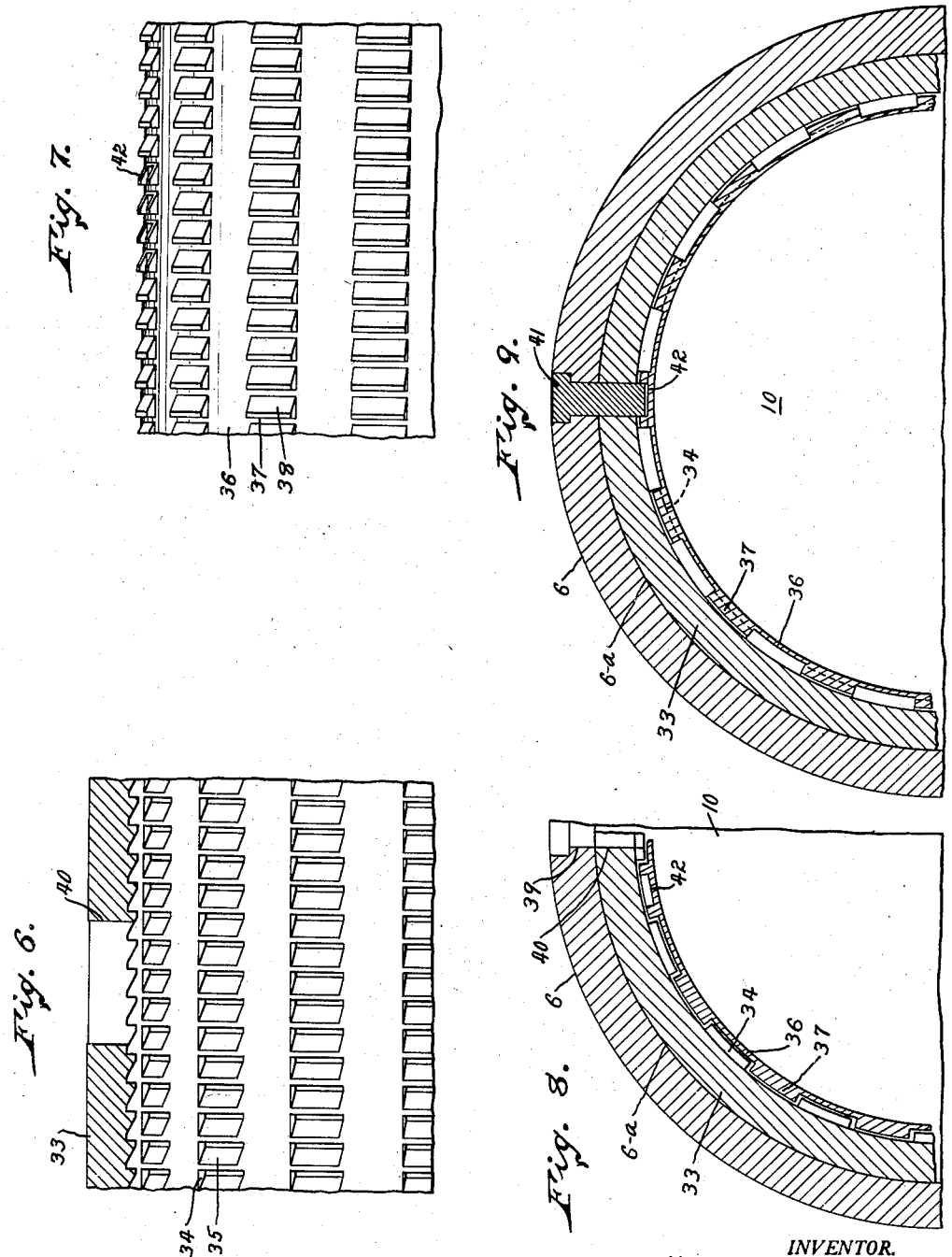

Nov. 4, 1958   H. E. SLOAN   2,859,041
COLLET CHUCKS
Filed April 11, 1958   4 Sheets-Sheet 4
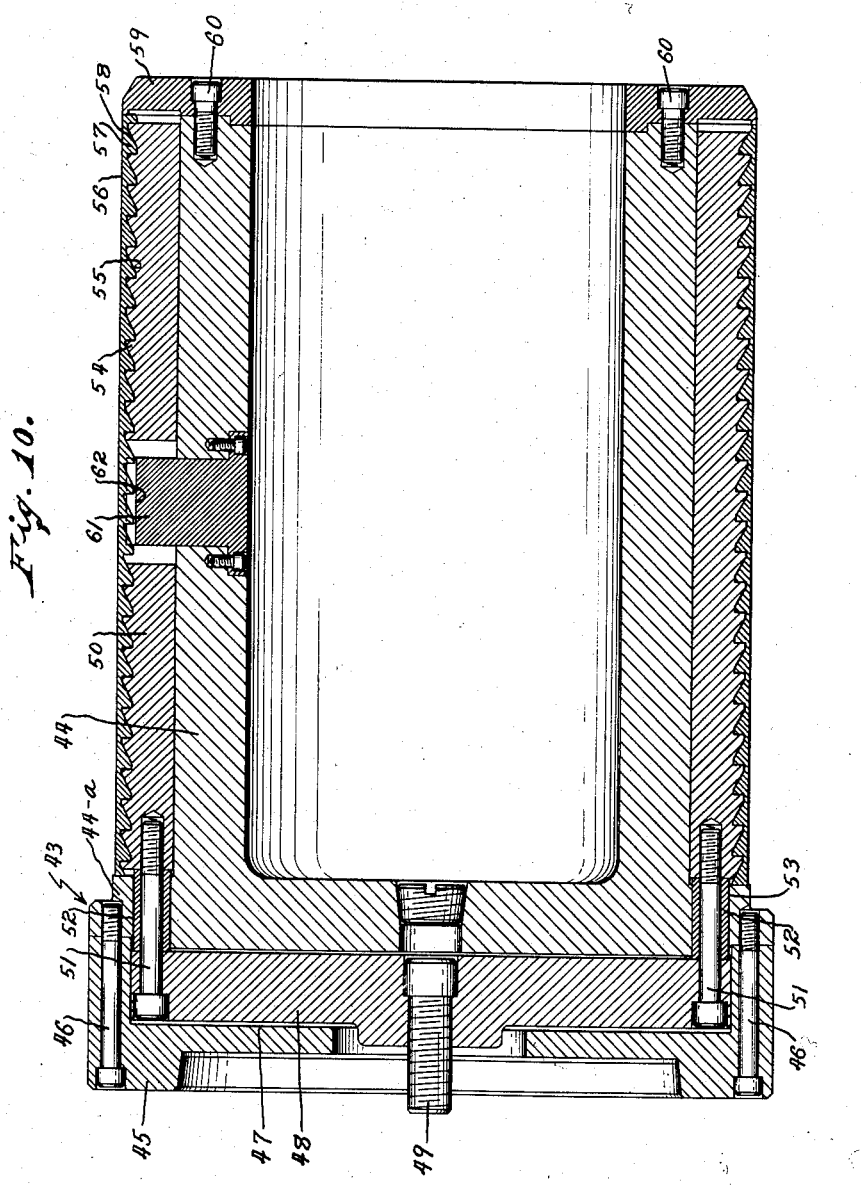
INVENTOR.
HARRY E. SLOAN
BY
Louis V. Lucia
ATTORNEY United States Patent Office 2,859,041
Patented Nov. 4, 1958

2,859,041

COLLET CHUCKS

Harry E. Sloan, Hartford, Conn., assignor to The Cushman Chuck Company, Hartford, Conn., a corporation of Connecticut Application April 11, 1958, Serial No. 727,884

17 Claims. (Cl. 279—2)

This invention relates to work-holding collet chucks of both the contracting and expanding types and also to the method of making such chucks.

Heretofore, the problem of chucking thin-wall, tubular workpieces for machining operations has proved to be most difficult. Conventional collets of the type having a plurality of angularly spaced, peripheral jaws are not well suited for this purpose because such jaws, when moved into work-gripping position, engage the surface of the workpiece at angularly spaced points and therefore tend to distort the workpiece.

The closest approach to a practical solution of this problem is provided by the chucks shown in my prior Patents No. 2,759,733, dated August 21, 1956, and 2,819,906, dated January 14, 1958. However, the teachings of these patents can be applied only to collet chucks of the expanding type and, although better suited for internally holding thin-wall workpieces than previous collets, the fact that these chucks have a plurality of peripheral jaws still renders them somewhat deficient for the stated purpose.

The primary object of the present invention, therefore, is to provide collet chucks for holding thin-wall workpieces both externally and internally without distorting said workpieces.

Another object of the invention is to provide collet chucks in which the work-gripping member engages substantially 100% of the surface of the workpiece, whereby radial pressure is applied evenly around the entire workpiece and distortion is thus prevented.

A further object of the present invention is to provide collet chucks for holding thin-wall workpieces in which the operating mechanism is completely sealed against the entry of chips or other foreign matter, thereby considerably extending the useful life of the chucks.

A still further object of the present invention is to provide collet chucks having a unitary, tubular work-gripping member which engages substantially the entire surface of the workpiece and therefore permits the application of optimum gripping force without the danger of bending or distorting even the most fragile workpiece.

Another object of the present invention is to provide collet chucks of the above mentioned type which are adapted to be actuated by conventional compressed-air or hydraulic chuck operating means normally found on lathes and other such machine tools.

It is a further object of the present invention to provide a novel method of making such chucks which assures substantially full surface contact between the work-gripping members of the chucks and the workpieces held thereby.

Briefly stated, my invention contemplates the provision of a work-holding collet chuck in which the work-gripping member is in the form of a one-piece, resilient, tubular sleeve having an uninterrupted thin wall, whereby the sleeve may be easily forced into gripping engagement with a workpiece and will return to normal relaxed condition upon being released. A plurality of angularly spaced, longitudinal rows of identical teeth are formed on the sleeve and each tooth has a cam surface thereon. The work-gripping sleeve is forced into gripping engagement with the workpiece by an actuating sleeve that is axially slidable with respect thereto and is provided with complementary cam surfaces which engage the cam surfaces on said teeth. The work-gripping sleeve is formed so that when distorted into work-gripping condition, its workpiece-engaging surface is circular in shape and thus engages the entire surface of the workpiece.

This invention will be more clearly understood from the embodiments thereof disclosed in the accompanying drawings in which:

Fig. 1 is a side view, partly in central vertical section, illustrating a preferred form of collet chuck embodying my invention and adapted for gripping a workpiece externally.

Fig. 2 is a sectional end view of said chuck taken substantially on line 2—2 of Fig. 1.

Fig. 3 is an enlarged fragmentary side view in central vertical section illustrating the operation of the chuck in an exaggerated manner.

Fig. 4 is a fragmentary sectional end view of the work-gripping sleeve of the chuck illustrating, in a greatly exaggerated manner, the actual shape of the work-gripping surface when said sleeve is relaxed.

Fig. 5 is a diagrammatic view illustrating an intermediate step in the manufacture of the work-gripping sleeve of Fig. 4.

Fig. 6 is a fragmentary sectional view illustrating a modified form of actuating sleeve for the chuck.

Fig. 7 is a fragmentary side view of the work-gripping sleeve that is used with the actuating sleeve shown in Fig. 6.

Fig. 8 is a fragmentary sectional end view illustrating the manner in which the work-gripping sleeve of Fig. 7 is inserted into the actuating sleeve of Fig. 6.

Fig. 9 is a fragmentary sectional end view showing the work-gripping sleeve in its normal position within the modified actuating sleeve.

Fig. 10 is a view similar to Fig. 1, but illustrating a collet chuck which is adapted to engage a workpiece internally.

Referring now to Fig. 1 of the drawings, in which I have illustrated a chuck for gripping a workpiece externally, the numeral 5 denotes the body of the chuck which includes a one-piece, rigid, cylindrical housing 6 having an axial bore 6–a. A mounting plate 7 is fastened to one end of said housing by a plurality of angularly spaced cap screws 8. The same end of the housing 6 is provided with an internal annular groove 9 which receives a circular supporting plate 10 that is held in position by an annular flange 7–a on the mounting plate 7, as will be clearly evident from Fig. 1.

The work-gripping member of the chuck is in the form of a one-piece, elongated, tubular metal sleeve 11 having an uninterrupted thin wall. Said sleeve 11 is located concentrically with respect to the housing 6 of the chuck and extends between the supporting plate 10 and a retaining ring 12 which is fastened to the open end of the housing 6 by a plurality of angularly spaced screws 13. The retaining ring 12 has an inwardly directed annular flange 14 which engages the adjacent end of the sleeve 11, whereby axial movement of the sleeve is prevented. The entire end surfaces of the sleeve are in contact with the supporting plate 10 and the flange 14, respectively, thus preventing the entry of chips or other foreign matter into the chuck.

The work-gripping sleeve 11 is moved into engagement with a workpiece by an actuating member in the form of a rigid, one-piece sleeve 15 that is axially slidable in the bore of the housing 6 of the chuck body and surrounds the sleeve 11.

The mounting plate 7 is provided with a circular recess 16 which is closed by the supporting plate 10, thus forming a circular chamber 17 in the chuck body. Said chamber receives a circular head 18 which has a small amount of axial sliding movement in said chamber and is connected to the actuating sleeve 15 by a plurality of angularly spaced cap screws 19. Said screws extend through bushings 20 which are clamped between the head 18 and the actuating sleeve 15 and are slidable in holes 21 extending through the supporting plate 10. It will thus be understood that the head 18 and the actuating sleeve 15 move axially in unison. In order to allow such movement, the said actuating sleeve is slightly shorter than the work-gripping sleeve 11.

The head 18 carries an axially extending screw 22 permitting attachment thereof to the power ram of a conventional air or hydraulic operating cylinder (not shown) which extends axially through the power spindle of the machine tool to which the chuck may be attached by studs 23 which extend from the mounting plate 7.

In the chuck illustrated in Fig. 1, the actuating sleeve 15 is provided with an internal screw thread 24 of the "buttress" type thus forming a continuous spiral cam surface 25 around the interior of the actuating sleeve which is inclined with respect to its axis and faces inwardly toward the supporting plate 10.

The work-gripping sleeve 11 is provided on its periphery with a plurality of equi-angularly spaced, longitudinal rows of integral teeth 26 which threadedly engage the buttress thread 24 formed in the actuating sleeve 15. The teeth 26 are parts of a continuous buttress thread which is originally formed on the periphery of the work-gripping sleeve 11. In order to reduce the stiffness of the sleeve, however, portions of the thread are subsequently cut away to form the rows of teeth 26 and each tooth therefore has a cam surface 27 which is opposed to and engages the continuous cam surface 25 formed by the buttress thread in the actuating sleeve 15.

Once the work-gripping sleeve 11 has been screwed into the actuating sleeve 15, relative rotational movement of these parts is prevented by a key 28 which extends radially through aligned openings in the housing 6 and the actuating sleeve 15 and is provided with a slot 29 in its lower end which receives the teeth 26 aligned therewith as shown in Figs. 1 and 2.

In the use of the chuck, the tubular workpiece (not shown) is inserted into the work-gripping sleeve 11 through the open end of the chuck. Said work-gripping sleeve is formed to fit very closely around the cylindrical surface of the workpiece so that full clamping force can be exerted thereon with a minimum of distortion of the work-gripping sleeve. When the head 18 is moved to the left, as shown in Fig. 3, by the air or hydraulic cylinder, the actuating sleeve 15 will also be moved to the left simultaneously therewith and relatively to the stationary work-gripping sleeve. Through the cooperation of the cam surfaces 25 and 27, each tooth 26 is thus forced radially inwardly, resulting in the application of uniform radial pressure along the rows of teeth and around the sleeve 11 which causes the wall thereof to distort sufficiently to tightly grip the workpiece. When the actuating sleeve is returned to normal position, the inherent resiliency of the work-gripping sleeve will cause it to return to its relaxed state permitting removal of the workpiece from the chuck.

In actual operation, the actuating sleeve is moved only .008–.012 of an inch, and the relationship of the cam surfaces 25 and 27 is such that the contraction of the work-gripping sleeve is very slight, amounting to not more than .002–.003 of an inch at the points of maximum deflection. Careful measurements have indicated that these points are approximately halfway between the rows of teeth with the amount of deflection decreasing toward the teeth and it is evident therefrom that, if the annular work-gripping surface of the sleeve was perfectly circular when the sleeve was in its normal relaxed state, said surface would be out-of-round when the sleeve is under pressure and in gripping engagement with the workpiece. Therefore, in order to achieve substantially 100% surface contact between the work-gripping sleeve 11 and the workpiece, said sleeve is formed so that when it is under pressure and in gripping condition, its work-gripping surface 11–a is absolutely circular.

The novel method which I employ to produce the sleeve 11 results in a work-gripping surface having the cross-sectional configuration illustrated in Fig. 4 when the sleeve is in its relaxed state. As shown in said Fig. 4, the work-gripping surface curves outwardly between each row of teeth 26, thus forming therein a plurality of equi-angularly spaced, longitudinally extending, shallow depressions 30 of concave cross-section conforming in shape and depth to the deflection pattern of the sleeve when distorted. These recesses are so shallow that they are not readily discernable upon visual inspection of the work-gripping sleeve, and it will be understood that the illustration in Fig. 4 has been greatly exaggerated in order to clearly show the invention.

In the manufacture of the chuck, the work-gripping surface of the sleeve 11 is first ground to approximately, but less than, the outside diameter of the workpiece while said sleeve is assembled in the chuck and is in its relaxed state. A predetermined amount of pressure is then applied to the operating cylinder of the lathe to cause distortion of the work-gripping sleeve 11. Careful measurements indicate that when radial pressure is applied to the sleeve 11 upon operation of the actuating sleeve 15, the deflection of the sleeve wall varies from a minimum along the rows of teeth to a maximum about half way therebetween so that the sleeve is bent out of its normally circular shape to the shape illustrated in Fig. 5, wherein the dotted lines represent the normal circular contour of the work-gripping sleeve when in its relaxed state and the full lines represent the shape of the sleeve when radial pressure is applied to the teeth 26 in the direction of the arrows 31.

While still under pressure, the work-gripping surface 11–a of the sleeve 11 is ground truly circular and to the outside diameter of the workpiece. During this final grinding operation, the shaded portions 32 (see Fig. 5) of the inner surface of the work-gripping sleeve are removed, thus reducing the wall thickness to a minimum at a point half way between the rows of teeth 26. When the pressure on the work-gripping sleeve is released and it resumes its relaxed state, the internal configuration of said sleeve will then be as illustrated in Fig. 4. However, when pressure is once again applied to the work-gripping sleeve, its inner surface will return to its truly circular shape and thereby contact substantially 100% of the surface of the workpiece. It is thus possible to securely grip the workpiece, without distorting it, by the application of relatively light pressure.

Figs. 6 through 9 illustrate a modified form of chuck which differs from that above described only in the cam means employed to effect contraction of the work-gripping sleeve upon axial movement of the actuating sleeve. Instead of a continuous buttress screw thread, the modified actuating sleeve, indicated at 33 in Fig. 6, is provided with a plurality of equi-angularly spaced, longitudinally extending rows of teeth 34, each of which has the cross-sectional configuration of the buttress thread previously described and is thus provided with a cam surface 35 which faces the supporting plate of the chuck.

In the manufacture of the modified sleeve 33, a plurality of equally spaced, annular rings, having the cross-sectional configuration shown, are first formed on the inside of said sleeve, each of said rings lying in a plane perpendicular to the axis of the sleeve. The sleeve is then longitudinally slotted to the full depth of the rings at equally spaced points therearound, thus forming the rows of teeth 34.

The modified work-gripping sleeve, indicated at 36 in Fig. 7, is provided on its exterior with similar rows of teeth 37 which are identical in cross-sectional shape to the teeth 34 on the actuating sleeve but reversed relatively thereto; said teeth 37 thus having cam surfaces 38 which are opposed to the cam surfaces 35. The spaces between the rows of teeth on the actuating sleeve and the work-gripping sleeve are slightly wider than the teeth themselves to permit insertion of the work-gripping sleeve axially into the actuating sleeve as illustrated in Fig. 8. By then merely rotating the work-gripping sleeve in a counterclockwise direction, as viewed in Fig. 8, the teeth thereon are brought into alignment with the teeth on the actuating sleeve 33, as illustrated in Fig. 9, and the cam surfaces 35 and 38 are brought into cooperative engagement.

The housing 6 of the chuck and the actuating sleeve 33 contain aligned, radially extending slots 39 and 40, respectively, which receive a key 41 that is fastened to said housing and projects into notches 42 in the teeth on the sleeve 36 aligned therewith. Said key prevents rotation of the work-gripping sleeve relatively to the actuating sleeve during operation of the chuck.

Fig. 10 illustrates a modified form of chuck embodying the novel features of my invention which is adapted to grip a thin-wall tubular workpiece internally. Said chuck comprises a body 43 including a rigid, elongated, cylindrical portion 44 which is open at one end and has at its opposite end an integral annular flange 44-a. A mounting plate 45 is secured to said flange by a plurality of angularly spaced cap screws 46 and is provided with an axial recess which is closed by the adjacent end of the body thus forming a circular chamber 47 in the chuck. Said chamber receives a circular head 48 that is axially slidable therein and carries an axially extending screw 49 permitting attachment of the head to the power ram extending from a conventional air or hydraulic cylinder of a lathe to which the chuck may be readily attached in the manner previously described.

The head 48 is connected to a rigid, tubular actuating sleeve 50 which is mounted for axial sliding movement on the exterior of the cylindrical portion 44 of the chuck body; the connection between the head 48 and the actuating sleeve 50 being provided by a plurality of angularly spaced cap screws 51 which extend through bushings 52 that are clamped between the head and the actuating sleeve and are slidable in holes 53 formed in the flange 44-a.

In the form of the invention illustrated in Fig. 10, a continous buttress thread 54 is formed on the exterior of the actuating sleeve, thus providing a continuous spiral cam surface 55 thereon.

The work-gripping sleeve 56 of the modified chuck encompasses the actuating sleeve 50 and has on its inner surface a plurality of equi-angularly spaced, longitudinally extending rows of teeth 57, of the same form as illustrated in Fig. 1, which are adapted to threadedly engage the buttress thread 54. Said teeth are formed in the same manner as the teeth 26 of the chuck disclosed in Fig. 1 and each tooth thus has a cam surface 58 which is opposed to and engages the cam surface 55 on the actuating sleeve. The work-gripping sleeve 56 is held against axial movement with respect to the chuck body by the flange 44-a, and by a retaining ring 59 which is secured to the open end of the cylindrical portion 44 by a plurality of screws 60.

Rotation of the work-gripping sleeve 56 relatively to the actuating sleeve 50 is prevented by a key 61 which is fastened to the cylindrical portion 44 of the chuck body and extends radially outwardly through aligned openings in said portion and said actuating sleeve 50. The end of said key is provided with a slot 62 which receives the teeth 57 on the work-gripping sleeve 56 aligned therewith.

In this form of the invention, the exterior of the sleeve 56 forms its work-gripping surface and, when the sleeve is relaxed, said surface contains the depressions (not shown) previously described. When the teeth 57 are urged radially outwardly upon operation of the actuating sleeve 50, the work-gripping surface assumes a circular shape and thus contacts substantially 100% of the surface of the workpiece.

Further details regarding the manufacture and operation of the chuck will undoubtedly be fully understood from the description previously set forth and it will also be apparent that the cam means on the actuating sleeve 50 and the work-gripping sleeve 56 may take the form disclosed in Figs. 6 through 9 instead of the thread form illustrated.

I claim:

1. In a collet chuck for holding a cylindrical workpiece, a work-gripping member comprising a resilient tubular sleeve having an unbroken cylindrical wall with annular surfaces, one of said surfaces fitting the workpiece closely when the sleeve is in its normal condition, and means for applying radial pressure to the other of said surfaces in the direction of the workpiece to distort said wall and thereby cause gripping of the workpiece.

2. In a collet chuck for holding a workpiece having a cylindrical surface, a work-gripping member comprising a tubular sleeve having a thin resilient wall with inner and outer annular surfaces, one of said surfaces forming a work-gripping surface which closely fits said cylindrical surface of the workpiece when the sleeve is in its normal condition, and means for applying radial pressure to the other surface of the sleeve in the direction of said workpiece and of sufficient magnitude to distort the said wall of the sleeve and cause said work-gripping surface to tightly engage said cylindrical surface of the workpiece.

3. In a collect chuck for holding a workpiece having a cylindrical surface, a work-gripping member comprising a resilient tubular sleeve having a continuous thin wall, one surface of said wall forming a work-gripping surface which closely fits the cylindrical surface of said workpiece when the sleeve is in normal condition, and means for applying radial pressure uniformly around the other surface of said wall in the direction of said workpiece and of sufficient magnitude to flex the sleeve wall out of its normal condition and thereby cause said work-gripping surface to tightly engage said cylindrical surface of the workpiece.

4. In a collet chuck for holding a cylindrical workpiece, a work-gripping member comprising a resilient tubular sleeve adapted to closely fit said workpiece, the annular surface of said sleeve adjacent the workpiece being out-of-round when said sleeve is relaxed whereby only a portion of said surface normally contacts said workpiece, and means for applying sufficient radial pressure uniformly around said sleeve in the direction of said workpiece to distort said sleeve and thereby cause said annular surface to assume a circular shape and be forced into total contact with the cylindrical surface of said workpiece.

5. In a collet chuck for holding a cylindrical workpiece, a work-gripping member comprising a resilient tubular sleeve having a plurality of lengthwise extending recesses around the wall thereof forming an irregular work-gripping surface when said sleeve is in its normal condition, the portions of said surface between said recesses fitting closely with the cylindrical surface of said workpiece, and means for applying radial pressure to distort the sleeve from its normal condition and force the surfaces of said recesses into circumferential alignment with the portions of the gripping surface between them and the total gripping surface into gripping engagement with the workpiece.

6. In a collet chuck for holding a cylindrical workpiece, a work-gripping member comprising a resilient tubular sleeve having a wall with inner and outer annular surfaces, one of said surfaces being adapted to engage a cylindrical surface of said workpiece and, when said sleeve is relaxed, containing a plurality of angularly spaced depressions extending throughout the longitudinal extent of said surface, and means for applying radial pressure uniformly to the other surface of said sleeve between said depressions to distort said sleeve and cause it to tightly grip the workpiece, the cross-sectional shape of said depressions substantially conforming to the deflection pattern of the said sleeve when distorted whereby said annular surface assumes a circular shape when said sleeve is under pressure and thereby engages substantially 100% of said cylindrical surface of the workpiece.

7. The subject matter of claim 6 wherein said depressions are shallow and of concave cross-section throughout.

8. In collet chuck for holding a cylindrical workpiece, a work-gripping member comprising a resilient tubular sleeve having a wall with a cylindrical surface at one side adapted to engage a cylindrical surface of said workpiece and, when said sleeve is relaxed, containing a plurality of angularly spaced shallow depressions of concave cross-section extending throughout the longitudinal extent of said surface whereby portions of the wall of said sleeve are reduced in thickness and subject to greater deflection than the portions of full thickness when radial pressure is applied to the other side of said wall uniformly along said portions of full thickness, and means for applying said pressure to distort said wall and cause it to tightly grip the workpiece, the cross-sectional shape of said depressions conforming substantially to the deflection pattern of said sleeve when distorted whereby, when said sleeve is under pressure, said surface of the sleeve wall assumes a circular shape and contacts substantially 100% of the surface of said workpiece.

9. A collet chuck for holding a cylindrical workpiece comprising a body having a cylindrical portion, a work-gripping tubular sleeve carried by said body and disposed concentrically with respect to said cylindrical portion, said sleeve having a continuous thin wall with a work-gripping surface at one side thereof adapted to fit closely with a cylindrical surface of said workpiece, means securing said sleeve against axial movement with respect to said body, an actuating sleeve mounted for axial sliding movement on said cylindrical part and disposed between said portion of the body and said work-gripping sleeve, means movably carried by said body for moving said actuating sleeve axially relatively to said work-gripping sleeve, and cooperative cam means on adjacent sides of said work-gripping sleeve and said actuating sleeve operable, upon axial movement of said actuating sleeve in one direction, to distort said work-gripping sleeve and thereby cause said work-gripping surface to tightly engage the cylindrical surface of said workpiece.

10. A collet chuck for holding a cylindrical workpiece comprising a body having a cylindrical part, an actuating sleeve axially slidable on said cylindrical part, means carried by said body for moving said actuating sleeve axially in two directions, a tubular work-gripping sleeve carried by said body and disposed concentrically with respect to said actuating sleeve, said work-gripping sleeve having an uninterrupted thin wall and a cylindrical surface adapted to closely fit a cylindrical surface of said workpiece when said sleeve is relaxed, means securing said work-gripping sleeve against axial movement with respect to said cylindrical part of the chuck body, a plurality of equi-angularly spaced longitudinal rows of projections on the surface of said work-gripping sleeve adjacent the actuating sleeve, each of said projections having a cam surface thereon, means providing cam surfaces on said actuating sleeve opposed to and engageable with the cam surfaces on said projections whereby, when said actuating sleeve is moved axially in one direction, said work-gripping sleeve is distorted and thereby tightly grips the cylindrical surface of said workpiece.

11. A collet chuck for holding a cylindrical workpiece as set forth in claim 10 wherein the cylindrical work-gripping surface of said work-gripping sleeve contains a depression between each of said rows of projections, each of said depressions being shallow and of concave cross-section and extending throughout the longitudinal extent of said work-gripping sleeve, said depressions conforming in shape and depth to the normal deflection pattern of said sleeve when distorted whereby said work-gripping surface assumes a circular shape when said sleeve is under pressure and thereby engages substantially 100% of the cylindrical surface of said workpiece.

12. A collet chuck for holding a cylindrical workpiece comprising a body having a cylindrical portion, an actuating sleeve mounted for axial movement on said cylindrical portion and having in its surface opposite said portion a screw thread providing a continuous spiral cam surface therearound, means carried by said body for moving said sleeve axially in two directions, a stationary tubular work-gripping sleeve disposed concentrically with respect to said actuating sleeve and having a wall with a plurality of equi-angularly spaced longitudinal rows of projections on one side thereof adapted to threadedly engage the screw thread on said actuating sleeve, each of said projections having a cam surface opposed to and engaging the cam surface on said actuating sleeve, the opposite side of said wall of the sleeve being adapted to closely fit a cylindrical surface of said workpiece when the sleeve is relaxed, and means carried by said body for moving said actuating sleeve axially whereby cooperation of said cam surfaces causes the application of radial pressure on said sleeve uniformly along each of the rows of projections, thus distorting the wall of the sleeve and causing it to tightly grip said workpiece.

13. A collet chuck for holding a cylindrical workpiece comprising a body having a tubular housing, an actuating sleeve mounted for axial sliding movement in said housing and having an internal screw thread formed to provide a continuous spiral cam surface therearound, a work-gripping sleeve contained within said actuating sleeve and having a thin wall provided on its periphery with a plurality of equi-angularly spaced longitudinal rows of projections adapted to threadedly engage the screw thread in said actuating sleeve, each of said projections being provided with a cam surface opposed to and engaging the cam surface of said screw thread, means retaining said work-gripping sleeve against axial movement relatively to said body, and means for moving said actuating sleeve relatively to the work-gripping sleeve to cause distortion of said work-gripping sleeve into gripping engagement with the workpiece.

14. A collet chuck for holding a cylindrical workpiece including a mounting plate, a cylindrical housing extending from said mounting plate, an actuating sleeve slidable within said cylindrical housing, a thin cylindrical work-gripping sleeve disposed within said actuating sleeve, means holding said work-gripping sleeve against axial movement in the chuck, the said work-gripping sleeve having a smooth unbroken work-gripping surface at the inner side thereof adapted to closely fit the workpiece, cooperative cam means between said actuating sleeve and said work-gripping sleeve operable, upon axial movement of the said actuating sleeve in one direction, to distort said work-gripping sleeve into tight engagement with the workpiece throughout substantially the total area of the work-gripping surface, and means carried by the mounting plate for moving said actuating sleeve.

15. A collet chuck for holding a cylindrical workpiece, said chuck including a mounting plate having a coaxial recess with a surrounding flange, a cylindrical housing mounted upon said plate and extending coaxially therefrom, a supporting plate coaxial with the mounting plate and secured between the annular edge portion of the flange and said housing, an axially movable actuating sleeve slidably mounted within the housing, a work-gripping sleeve disposed within said actuating sleeve, a retaining ring mounted upon the free annular edge of the housing and clamping the work-gripping sleeve against the supporting plate to thereby prevent axial movement of said work-gripping sleeve, the said work-gripping sleeve having a continuous work-gripping surface with portions thereof normally adapted to closely fit the workpiece and portions normally spaced from the workpiece, cam means between said work-gripping and actuating sleeves operable upon axial movement of the actuating sleeve in one direction to cause distortion of the wall of the work-gripping sleeve thereby forcing the spaced portions of the work-gripping surface towards the workpiece and, with the close-fitting portions, providing substantially total contact between the said gripping surface and the entire surface of the workpiece adjacent thereto, and means movable within said recess of the mounting plate connected to the operating sleeve through the supporting plate for moving said actuating sleeve.

16. A collet chuck as set forth in claim 15 wherein the cam means include a plurality of individual projections disposed in angularly spaced rows extending lengthwise of the work-gripping sleeve upon the exterior surface thereof and having cam surfaces, and cooperating cam means on the interior surface of the actuating sleeve.

17. A collet chuck as set forth in claim 16 wherein the cam means on said actuating sleeve comprise a screw thread upon the inner surface thereof formed to provide a continuous spiral cam surface cooperating with the cam surfaces on the work-gripping sleeve.

References Cited in the file of this patent

UNITED STATES PATENTS

| | | |
|---|---|---|
| 2,331,504 | Raymond et al. | Oct. 12, 1943 |
| 2,372,723 | Jasper | Apr. 3, 1945 |
| 2,801,858 | Spieth | Aug. 6, 1957 |
| 2,827,300 | Nyland | Mar. 18, 1958 |